Patented Jan. 23, 1945

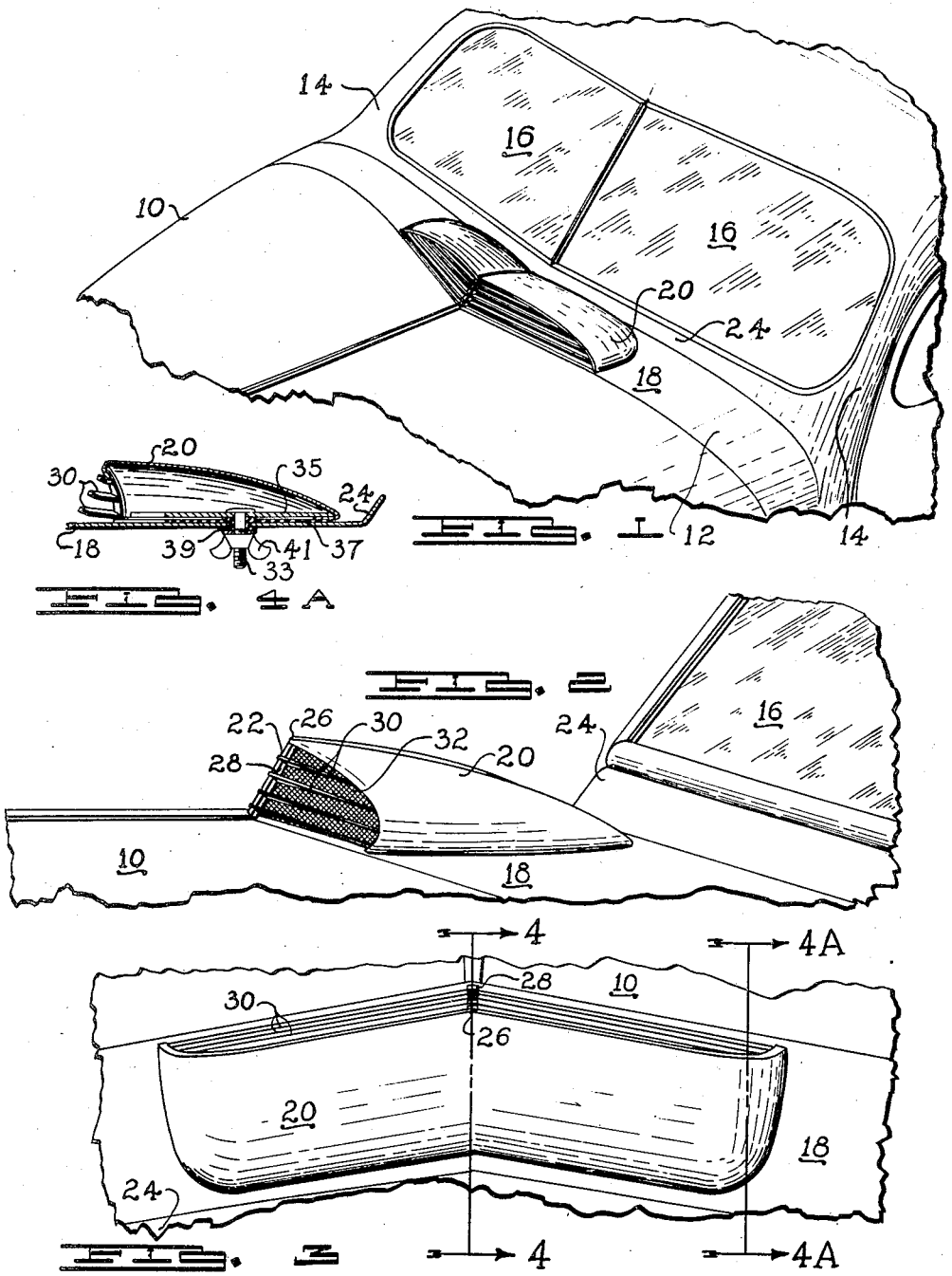

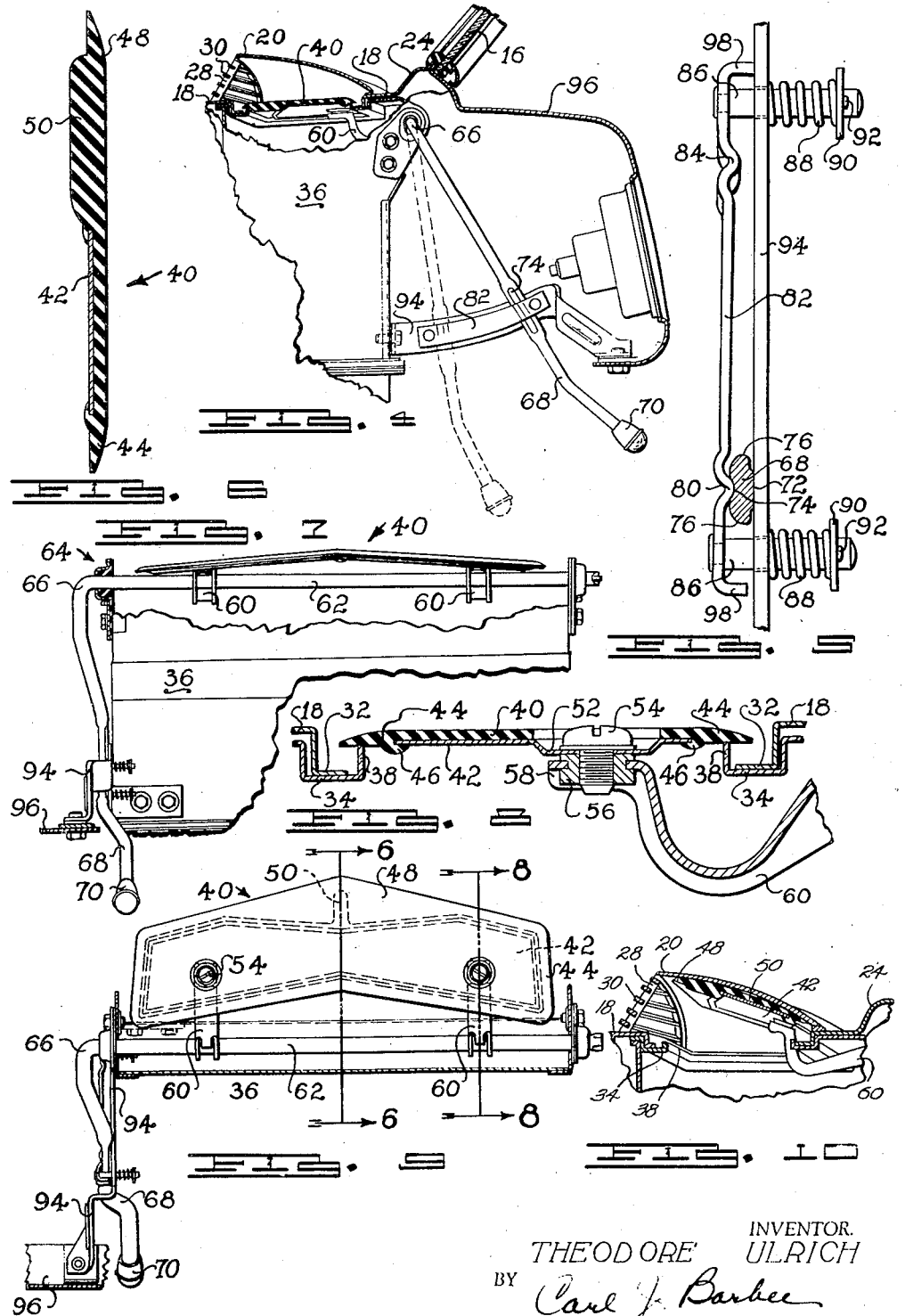

2,367,904

UNITED STATES PATENT OFFICE 2,367,904

COWL VENTILATOR

Theodore Ulrich, Milwaukee, Wis., assignor to Nash-Kelvinator Corporation, Kenosha, Wis., a corporation of Maryland Application November 3, 1941, Serial No. 417,595

5 Claims. (Cl. 98—2)

This invention relates to cowl ventilators and more particularly to cowl ventilators which are used in conjunction with an automobile body to provide an inlet for fresh air which is to be used in heating the interior of the automobile body.

In cars in which the cowl ventilator is employed for entraining air which is passed through a heating chamber, it is customary to permit the door or cover for the aperture through the cowl to remain in its opened position at all times since adequate provision has been made in such cars for the removal of moisture such as rain, snow and sleet in the quantities normally encountered. It has only been necessary to provide a door or closure for the ventilating opening because of the possibility of encountering extremely heavy rain storms or the like in which the moisture content of the air may exceed the capacity of the moisture removing instrumentalities. Such open doors upon the cowls of vehicles are in many respects considered unsightly as they do not possess lines which blend pleasingly with the external styling of the vehicle. Furthermore, such cowl ventilator doors do not constitute the most efficient means for entraining air to be used in heating and ventilating an automobile interior in as much as they have rough or unfinished edges which are presented to the air stream and serve to break up the smooth air flow over the hood and cowl of the car in a manner which is not in any respect conducive to streamlining.

It is therefore an object of this invention to provide a cowl ventilator structure in which the usual aperture through the cowl of the car is covered with a forwardly opening superstructure which is raised above the cowl a distance sufficient to cause the entrainment of air for ventilating purposes and yet insufficient to interfere with the vision of the driver or other car occupant.

It is a further object of the invention to provide a cowl ventilator of the character described in which the superstructure is pleasingly rounded or streamlined so as to prevent little or no disturbance of the air stream flowing over the hood and cowl of the autombile and yet which will function efficiently to entrain a sufficiently large quantity of air for ventilating purposes.

Because of the necessity of streamlining the upper surface of the superstructure so as to present little interference to the air stream and because the usual cowl is relatively flat or only slightly crowned, it will be recognized that the under surface of the superstructure and the upper surface of the cowl do not possess similar contours or configurations.

It will also be recognized that it would be inefficient to provide moisture removing facilities within the cowl ventilator which would function to dispose of any quantity of moisture which may be found in the entering air stream because of the extreme infrequency of encountering excessive moisture conditions in the normal driving of an automobile. However, since such excessive moisture conditions (such as cloudbursts) are occasionally encountered, it is still necessary to provide a door or cover for the cowl ventilating aperture which must not only seal the aperture when it is in closed position but must also seat against the underside of the cowl superstructure so as to assist the superstructure in the entrainment and guidance of the entering air.

A further object of the invention is therefore to provide a door or cover for the ventilating aperture through the cowl, which door has portions of sufficient flexibility to seal the same to the edges of the cowl ventilating aperture and yet to permit it to conform to the curvature of the underside of the cowl superstructure.

With such arrangement, it will be recognized that there is no advantage to be gained by only partially opening the cowl ventilator. Accordingly, a further object of the invention is to provide operating means for opening and closing the cowl ventilator cover which will function in such a way as normally to prevent partial opening or partial closing of the cover.

A still further object of the invention is to provide a cowl ventilator and operating means for opening and closing the cover for the same which will be efficient in operation, simple in design and inexpensive to construct.

Further objects will appear hereinafter as the description proceeds and will be pointed out in connection with the appended claims.

In the drawings, of which there are two sheets, and in which similar reference characters are used throughout to designate similar parts;

Figure 1 is a perspective view of a portion of an automobile showing the hood, cowl and windshield structure;

Figure 2 is a side elevational view of the hood, cowl ventilator and windshield shown in Figure 1;

Figure 3 is a plan view of the ventilator portion of the cowl shown in Figures 1 and 2;

Figure 4 is a vertical, longitudinal, sectional view taken upon a plane as indicated by the line 4—4 of Figure 3 and looking in the direction of the arrows;

Figure 4A is a vertical sectional view taken upon a plane as indicated by the line 4A—4A of Figure 3 and looking in the direction of the arrows;

Figure 5 is a detail view of the detent mechanism used in connection with the cover opening and closing structure;

Figure 6 is a longitudinal, vertical, sectional view through the central portion of the cowl ventilator cover or door and taken upon a plane as indicated by the line 6—6 of Figure 9;

Figure 7 is a rear elevational view of the cowl ventilator structure of the invention, parts being broken away in order to more clearly illustrate the structure;

Figure 8 is a vertical, longitudinal, sectional view through a portion of the cowl ventilator cover or door at its point of attachment to the ventilator operating instrumentalities and taken upon a plane as indicated by the line 8—8 in Figure 9;

Figure 9 is a plan view of the cowl ventilator cover and its associated instrumentalities, parts being broken away in order more clearly to show the invention; and Figure 10 is a vertical sectional view corresponding to Figure 4 but showing the closure in its open position.

Referring more particularly to the drawings, there is illustrated an automobile having a hood 10 which may be supported from the cowl structure 12 at the rear thereof. The cowl 12 constitutes a part of an automobile body which may include windshield posts 14 and a windshield 16.

Upon the central slightly crowned portion 18 of the cowl 12 there is provided a raised superstructure 20 (as viewed in side elevation in Figure 2) which rises abruptly upwardly and rearwardly from the juncture of hood 10 and cowl 18 as at 22 to a distance above the cowl 18 which is not greater than the vertical extent of the lower frame 24 of the windshield 16 above the cowl 18. From this high point 26 of the cowl superstructure 20, the superstructure sweeps rearwardly and downwardly upon a long curve to terminate adjacent the bottom edge of the windshield frame 24.

As viewed from above (see Figure 3) the superstructure will be seen to comprise two rearwardly diverging portions which conform to the rearwardly diverging break lines forming the juncture between the hood 10 and cowl 18 as well as to the V-shape of the windshield. It will also be noted that the height of the superstructure is gradually decreased toward its lateral edges so as to terminate in a smooth curve entirely around the lateral and rear edges of the superstructure.

Referring again to Figure 2, attention is directed to the front spacer element or strut 28 which serves to support the upper forward edge of the superstructure 20 and also acts to provide a support for the inner edges of louver bars 30 which serve a decorative purpose. To the rear of the louver bars 30 there may be attached as by welding or other suitable means an insect screen 32 for excluding insects and other relatively large foreign bodies from the cowl ventilator.

The superstructure is attached to the cowl by means of bolts 33 which are welded or otherwise secured to a plate 35 forming a base for the superstructure 20. Bolt 33 may extend through a cushion 37 of sheet rubber which insulates the superstructure from the cowl and through a grommet 39 located in an aperture in the cowl, a wing nut 41 being threaded upon bolt 33 to hold the superstructure in place. It will be understood that two or more such bolts may be used.

Referring to Figures 4 and 8, it will be recognized that the cowl 18 is provided with an aperture around which the metal forming the cowl is downwardly and inwardly flanged at 32. A channel section 34, forming a top edge of a plenum chamber or air intake hopper 36, is welded to the inwardly flanged portion 32 of the cowl 18 and provides an upstanding flange 38 with which the underside of the door or cowl ventilator cover 40 is adapted to mate for the purpose of excluding air from the cowl ventilator.

The cowl ventilator door 40 as shown in Figures 7 and 9 conforms in plan to the plan outline of the superstructure 20 and ventilator opening and in rear elevation (Figure 7) to the slight crown of the upper cowl surface 18.

Referring again to Figure 8, the cowl ventilator door 40 is shown as comprising a metal plate or core 42 which is imbedded in and bonded to a rubber sheath 44. The rubber sheath 44 extends beyond the plate 42, which is smaller in extent than the cowl ventilator opening as defined by the flanges 38, so that a sealing contact between the cover and the flanges 38 is obtained entirely by the free rubber margin 44 which extends around the periphery of the cover 40. A bead 46 may be provided adjacent the edges of the reinforcing plate 42 to insure against the separation of the plate from the rubber portion of the cover.

By reference to Figure 9 it will be noted that the metal reinforcing plate 42 shown therein in dotted outline does not have an outline similar to the cover itself but instead has its forward portion cut off across the front edge of the cover so as to provide a relatively wide free margin 48 of relatively great flexibility along a substantial portion of the front edge of the cover for a purpose which will shortly be explained. This structure also is apparent in Figure 6. At the central portion of the wide forward lip 48, the rubber of the cover is reinforced upon its underside by means of a bead 50 formed integrally with the rubber. This bead 50 serves to stiffen the rubber lip 48 to prevent its curling or distortion.

The reinforcing plate 42 is provided adjacent each of its lateral edges with a downwardly offset portion 52 for the purpose of receiving a screw fastener 54 through an aperture therein, which screw fastener is adapted to be threaded into a clinch nut 56 secured in the forward end 58 of a stamped arm 60. The arms 60 may be secured in any suitable manner (as by welding) against rotation upon a rod 62 which extends through a rearwardly extending portion of the air hopper 36. The rod 62 emerges from the air hopper 36 through a packing gland 64 to prevent the escape of air from the hopper at that point and is bent downwardly and rearwardly as at 66 to provide an operating handle 68 for the cowl ventilator cover. The lower end of the handle 68 may be offset and provided with a suitable knob 70 to be grasped by the operator for operation of the cover.

Intermediate the ends of the handle 68 there is provided a flattened portion which is more clearly illustrated in Figure 5. The flattened portion comprises a flat 72 upon one side of the handle and a depression 74 upon the opposite side of the handle. The fore and aft edges of the handle 68 in this vicinity are rounded off as at 76.

The depression 74 in the operating handle 78 is adapted to cooperate with a re-entrant bend 80 in a detent member 82 when the cowl ventilator cover is in its closed position. The detent member 82 is also provided with a second re-entrant bend 84 adjacent its forward end to cooperate with the depression 74 when the cowl ventilator cover is in its open position. Detent member 82 has pins 86 secured thereto as by heading over the ends of the pins, such pins being surrounded by springs 88 and washers 90 held in place by cotter pins 92 for the purpose of compressing the springs 88 against a brace 94 which extends from the air hopper 36 to the lower edge of an instrument panel 96. The front and rear edges of the detent 82 are bent laterally as at 98 to provide stops for spacing the detent from the brace 94.

It will be recognized that it will require a considerable degree of force to move the handle from either one of the positions in which the recess 74 is engaged by either the re-entrant bend 80 or bend 84 and that when this movement has been accomplished, the operator will, by reason of the force exerted, move the handle 68 to the other limit of its movement before it is possible for him to stop it.

It will be noted that the central portion 48 of the cover 40 lies relatively flat in its closed position as shown in Figure 4. In the open position shown in Figure 10, the forward edge of the ventilator cover which comprises a relatively wide flexible lip 48 is bent or curved to conform it to the curvature of the underside of the cowl superstructure 20, this variation being made possible by reason of the relatively wide flexible lip forming the forward edge of the cover 40.

It will thus be seen that I have provided a cowl ventilator structure which is more sightly and more efficient than those presently in use and which can be operated in times of necessity to be closed for the exclusion of moisture laden air. It will also be recognized that this more efficient cowl ventilator structure is easy to operate, can readily be attached to cars presently in use and is economical to manufacture.

While the invention has been described in considerable detail, such description is not to be taken as limiting the invention. All equivalents falling within the scope of the attached claims are specifically reserved.

I claim:

1. In an automobile having an external surface provided with a ventilating aperture therein, a superstructure attached to the surface and embracing said aperture, the interior of said superstructure being dissimilar in contour to said external surface, and a cover within said superstructure movable to close said aperture by cooperation with said external surface and fully to open said aperture by cooperation with the internal surface of said superstructure, said cover being provided with a rigid core and a flexible sheath extending over substantially the entire upper surface thereof and having a flexible peripheral portion extending beyond said core to provide a lip adapted alternately to seal with said external surface and said internal surface, to close or open the aperture, respectively, the variation in contour between said external and internal surfaces being greatest along one edge, the flexible portion of said cover being of greatest extent adjacent said edge.

2. In an automobile having an external surface through which a ventilating aperture extends, a cover for said aperture hinged to said automobile and comprising a core of relatively stiff material smaller in extent than said aperture and a sheath of relatively flexible material secured to said core, said sheath extending over substantially the entire top surface of said core and peripherally beyond said core along all edges to provide a flexible lip for cooperation with the edges of said aperture, said lip being of greater extent along one edge than along other edges.

3. In an automobile having an external surface through which a ventilating aperture extends, a cover for said aperture hinged to said automobile and comprising a core of relatively stiff material smaller in extent than said aperture and a sheath of relatively flexible material secured to said core, said sheath extending over substantially the entire top surface of said core and peripherally beyond said core along all edges to provide a flexible lip for cooperation with the edges of said aperture, said lip being of greater extent along one edge than along other edges, said lip of greater extent being reinforced by a rib formed integrally of said flexible material.

4. In an automotive vehicle, a windshield, a cowl located ahead of said windshield and provided with a transversely-extending, slightly crowned, upwardly-presented surface defining a ventilating opening, a superstructure seated upon and secured to said cowl surrounding the ventilating opening and having a forwardly opening air intake, a cover for said cowl ventilating opening located within the superstructure and including a rigid core and a flexible sheath extending over substantially the entire upper surface of said core and bonded thereto, said sheath extending peripherally beyond said core to provide a flexible lip for alternately sealing against the undersurface of the superstructure or said cowl in fully open or fully closed position respectively, means pivoting said cover to said vehicle upon an axis spaced from said cover, and means arranged to move said lip about said axis into contact with either said superstructure undersurface or said cowl, said superstructure undersurface having a sharper curvature than the curvature of said cowl crown.

5. A ventilating aperture door comprising a core of sheet metal, a sheath of rubber extending over the top surface of said core and bonded thereto, a bead integral with said sheath at the periphery of said core and having a portion embracing said periphery and extending onto the lower side of said core, and a flexible lip integral with said sheath and bead and extending laterally outwardly beyond said bead entirely thereabout.

THEODORE ULRICH.